Jan. 11, 1927.
R. A. HEISING
1,613,949
ELECTRIC WAVE FILTER
Filed July 20, 1923
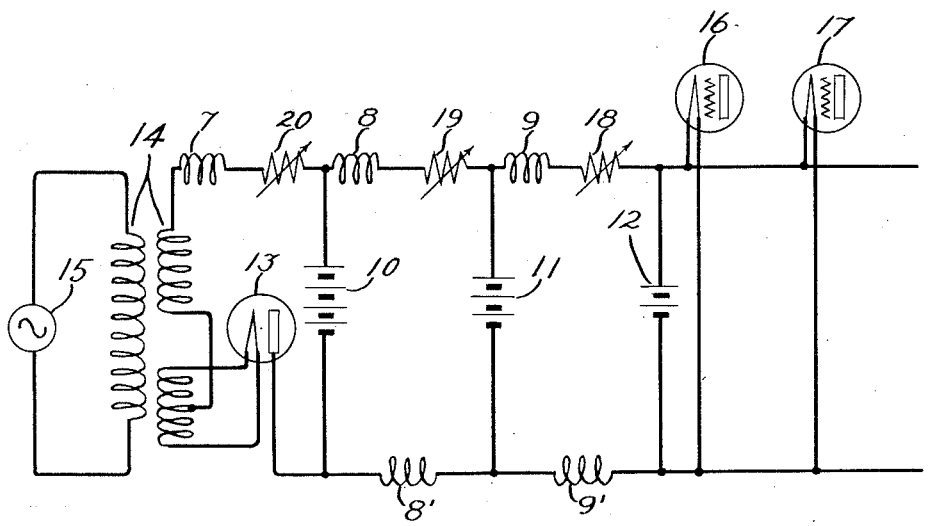
Inventor
Raymond A. Heising
by Jnl A. Palmer Att'y.

Patented Jan. 11, 1927.

1,613,949

UNITED STATES PATENT OFFICE.

RAYMOND A. HEISING, OF MILLBURN, NEW JERSEY, ASSIGNOR TO WESTERN ELECTRIC COMPANY, INCORPORATED, OF NEW YORK, N. Y., A CORPORATION OF NEW YORK.

ELECTRIC WAVE FILTER.

Application filed July 20, 1923. Serial No. 652,702.

This invention relates to electric wave filters, particularly of the type capable of suppressing alternating currents of very low frequencies.

An object of this invention is to provide an electrical network capable of suppressing an undesired frequency or band of frequencies in a transmission circuit.

It has hitherto been proposed to suppress low frequency fluctuations by an electric wave filter of a plurality of sections, each section comprising one or more series inductances and a shunt storage battery. The storage battery has been found to function as a large capacity so that the series inductances and shunt batteries may be made to function as a low pass filter which will transmit substantially only direct current.

In accordance with one form of this invention, the arrangement of the filter is such that the batteries although kept floating across the line will neither be overcharged nor allowed to run down. A much longer period of usefulness will consequently be derived from the filter. One way in which batteries may be kept floating across the line is to have them of gradually increasing voltage from the output terminals to the input terminals of the filter, with a series resistance in each section of the filter adjusted to cause each battery to have an effective potential drop across the terminals of the succeeding battery exactly equal to the voltage of the said succeeding battery.

Referring to the drawing, the figure illustrates this invention applied to a current supply set for heating vacuum tube filaments with rectified alternating current.

As described and claimed in the U. S. patent to Campbell 1,227,113 of May 22, 1917, any desired frequency or band of frequencies may be substantially suppressed by an electric wave filter of a plurality of sections, each section of which comprises one or more series inductances and a shunt capacity, the inductances and capacities having values depending upon the range of free transmission desired and the cut-off point. Storage batteries and electric dry cells have been found to have an enormous capacity so that it is possible to substitute such batteries for the shunt capacities of the low-pass filter while still obtaining the free transmission over the desired range with the substantial suppression of frequencies outside the range of frequencies to be transmitted. The drawing illustrates an electric wave filter comprising a plurality of series inductances 7, 8, 8', 9 and 9' and a plurality of shunt batteries 10, 11 and 12. These inductances and batteries may be adjusted to give substantially free transmission for all frequencies up to a desired cut-off frequency. Owing to the enormous capacity of a storage battery or dry cell, the arrangement disclosed is particularly useful where the cut-off frequency is very low, below 100 cycles, for example, or in cases where it is desired to transmit only direct current and suppress alternating current of all frequencies to a much greater degree than heretofore. Such a filter is therefore particularly useful in suppressing fluctuations in a rectified alternating current.

In the particular application of this invention shown in the drawing, the input terminals of the wave filter are connected to the electrodes of a vacuum tube rectifier 13 which is employed for rectifying alternating voltage impressed thereon through a transformer 14 from a suitable alternating current source 15. The output terminals of the filter are connected to a suitable load circuit which may comprise a plurality of filaments 16 and 17 of vacuum tube repeaters or translating devices. The wave filter comprising the inductances and the batteries may be adjusted to insure that the voltage impressed upon these vacuum tube filaments is substantially free from fluctuations of even low frequencies.

It is very desirable, from an operating standpoint, that the batteries 10 to 12 shall neither be overcharged nor allowed to run down while the filter is in use. One way these batteries may be kept floating across the line is to have battery 12 of the voltage desired to be impressed across the terminals of the load circuit. The adjacent battery 11 is made of a slightly higher voltage than battery 12 and a series resistance 18 is adjusted until the potential drop across the terminals of battery 12 due to battery 11 is equal to the voltage of battery 12. Similarly, battery 10 is made to have a somewhat greater voltage than battery 11 and an adjustable resistance 19 is set such that the drop in potential across the terminals of battery 11 due to battery 10 is equal to the voltage of battery 11. The direct current voltage output from the rectifier 13 should be of slightly greater voltage than battery 10 so that resistance 20 or inductance 7, or both may be adjusted to give across the terminals of battery 10 a direct current voltage from the rectifier equal to the voltage of the battery. With such an adjustment, the batteries 10, 11 and 12 will float across the line and will be capable of indefinite service with the minimum of attention from the operator.

With a wave filter of two sections of the type described above it has been found possible to energize the filaments of a detector and two stages of amplification without being able to distinguish in head receivers connected to the output of the second stage any hum due to the rectified alternating current.

The invention claimed is:

1. An electric wave filter comprising a connecting line composed of a plurality of sections, each section comprising a series reactance and a shunt battery, said reactances and batteries having such values as to substantially suppress a wide range of frequencies while freely transmitting currents outside said range, said batteries being of graduated voltages, said filter being adjusted to cause said batteries to float across the line.

2. An electric wave filter comprising a connecting line composed of a plurality of sections and having input terminals adapted to be connected to a source of current, and output terminals adapted to be connected to a load circuit, each of said sections comprising a series inductance and a shunt battery, said inductances and said batteries having such values as to substantially suppress a wide range of frequencies impressed upon said input terminals while freely transmitting to said load circuit currents outside said range, the voltages of said batteries being of graduated values, the battery adjacent the input terminals having the maximum value and the battery adjacent the output terminals having the minimum value, and means for causing said batteries to be floated across the line.

3. An electric wave filter comprising a connecting line composed of a plurality of sections, each section comprising an inductance and an adjustable resistance in series with the line, and a battery in shunt to the line, said inductances and said batteries having such values as to substantially suppress all frequencies while freely transmitting only direct current, said batteries being of graduated voltages, said resistance having such values as to cause said batteries to be floated across the line.

4. An electric wave filter comprising a connecting line composed of a plurality of sections and having input terminals adapted to be connected to a source of current and output terminals adapted to be connected to a load circuit, each of said sections comprising an inductance and a resistance in series with the line and a battery in shunt to the line, said inductances and said batteries having such values as to substantially suppress a wide range of frequencies impressed upon said input terminals, while freely transmitting to said load circuit currents outside said range, the voltages of said battery being of graduated values decreasing from said input terminals to said output terminals, said resistances being of such values that the voltage across the line at each section is substantially equal to the voltage of the shunt battery of that section.

In witness whereof, I hereunto subscribe my name this 16th day of July A. D., 1923.

RAYMOND A. HEISING.